US007797066B2

(12) United States Patent
Lengeling et al.

(10) Patent No.: US 7,797,066 B2
(45) Date of Patent: Sep. 14, 2010

(54) OFF-STAGE CONTROL OF ON-STAGE DIGITAL AUDIO PROCESSING

(75) Inventors: Gerhard Lengeling, Los Altos, CA (US); Nikolaus Gerteis, Horst (DE)

(73) Assignee: Apple Inc., Cupertino, CA (US)

( * ) Notice: Subject to any disclaimer, the term of this patent is extended or adjusted under 35 U.S.C. 154(b) by 800 days.

(21) Appl. No.: 11/580,460

(22) Filed: Oct. 13, 2006

(65) Prior Publication Data

US 2008/0091286 A1 Apr. 17, 2008

(51) Int. Cl.
*G06F 17/00* (2006.01)

(52) U.S. Cl. .................................................... 700/94

(58) Field of Classification Search ................... 700/94; 369/1-12; 381/119
See application file for complete search history.

(56) References Cited

U.S. PATENT DOCUMENTS 7,242,990 B2 * 7/2007 Suyama et al. ................ 700/94
2004/0073419 A1 * 4/2004 Aoki et al. .................. 704/201
2005/0207595 A1 * 9/2005 Suzuki ....................... 381/111

OTHER PUBLICATIONS

Roland, "Digital Snake—Overview," Copyright Roland Corporation—2004, located on the internet at, http://www.roland.com/products/en/Digital_Snake/index.html, retrieved on Jan. 18, 2007, 1 page.
Roland, "Digital Snake—Owners Manual—Users Agreement," Copyright Roland Corporation—2004, located on the internet at, http://www.roland.com/products/en/_support/om.cfm?iCncd=910&In=EN&SearchBy=Rcld&dst=P&iRcId=0000009751&dsp=1, retrieved on Jan. 18, 2007, 1 page.
Roland, "S-4000 RCS for McIntosh—User Guide," Copyright Roland Corporation—2005, pp. 1-8.

* cited by examiner

*Primary Examiner*—Andrew C Flanders
(74) *Attorney, Agent, or Firm*—Hickman Palermo Truong & Becker LLP

(57) ABSTRACT

A digital processing stage-box that may be placed on stage to process audio input from on-stage audio input devices and generate output to audio output devices for playback to an audience. The on-stage audio input and output devices may be connected to the digital processing stage-box using an analog or network cable connection. The digital processing stage-box is controlled from a remote control device preferably connected to the digital processing stage-box via a wireless network connection. This arrangement allows the electronics needed to process audio input and output to be placed on or close to a stage.

20 Claims, 4 Drawing Sheets

OFF-STAGE CONTROL OF ON-STAGE DIGITAL AUDIO PROCESSING

FIELD OF THE INVENTION

The present invention relates to audio systems, and particular, to audio system playback to an audience during a live musical performance.

BACKGROUND

Advances in digital processing of audio have transformed the way music from multiple instruments and vocalists are mixed and otherwise processed. Yet, despite these advances, a key aspect of playing back music to an audience during a live musical performance remains fundamentally analog. This key aspect is that the interconnection between musical input and output devices to and from a mixer used to control the playback of the music is largely analog.

To illustrate, an illustrative audio system 101 for a musical concert is depicted in FIGS. 1A and 1B. Audio system 101 includes stage-box 110, which is connected to mixer 130 via multi-core cable 120. Stage-box 110 is within stage area 102, which is located in front of audience area 103, within which mixer 130 is located.

Stage-box 110 is a mechanism for consolidating multiple electrical connections between audio input and output devices and mixer 130 through multi-core cable 120. Multi-core cable 120 comprises a bundle of wire connections for carrying audio signals between audio input and output devices and mixer 130.

Specifically, multi-core cable 120 connects each of on-stage audio input devices 140 to mixer 130. Audio input devices 140 include vocal microphone 142, drum microphones of drum set 144, and electrical guitar 146.

Each of the on-stage audio input devices is connected to mixer 130 via one of input ports 112 on stage-box 110. An input port 112 provides a connection to mixer 130 via a wire connection within multi-core cable 120. Vocal microphone 142, drum microphones of drum set 144, and electrical guitar 146 are connected to mixer 130 via an input port 112 of stage-box 110.

Output from mixer 130 is received via an output ports 114. An output port 114 provides a connection from mixer 130 via a wire connection within multi-core cable 120 to an audio output device. Amplifiers 116 and 118, which are on-stage audio output devices, are connected to an output port 114, through which amplifiers 116 and 118 receive output from mixer 130. Amplifiers 116 and 118 are connected to speakers that playback audio from audio input devices 140.

A feature to note about stage-box 110 is that all connections between stage-box 110 and audio input and output devices and mixer 130 may be entirely analog. Stage-box 110 only carries analog signals between the audio input devices 140 and mixer 130; it does not amplify or otherwise electronically process these signals.

Attempts have been made to replace an analog multi-core cable with a digital multi-core cable. An example is the "Digital Snake", made by Roland Corporation. Even though this solution relies on transmission of digital audio data, the digital audio data, like an analog audio signal, is nevertheless transmitted via a multi-core cable between a stage-box and a mixer located off-stage.

Multi-Core Cables are Expensive and Unwieldy

Multi-core cables are exposed to mechanical damage hazards posed by audiences and other activities related to producing a live musical performance. Thus, the multi-core cable has a very hardy sheath that can withstand such hazards. In addition, because the multi-core cables can be very long and contain many wires, multi-core cables are heavy and unwieldy and are very expensive.

Clearly, there is need for better way to interconnect a mixer to its various audio input and output devices for the live production of music.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a digital processing stage-box that may be placed on stage to process audio input from on-stage audio input devices and generate output to audio output devices for playback to an audience. The on-stage audio input and output devices may be connected to the digital processing stage-box using an analog or network cable connection. The digital processing stage-box is controlled from a remote control device preferably connected to the digital processing stage-box via a wireless network connection.

This arrangement allows the electronics needed to process audio input and output to be placed on or close to a stage, eliminating the need to transmit audio input and output—analog or digital—to a mixer located far off-stage via a multi-core cable that runs through the audience. The need for an expensive and unwieldy multi-core cable is thus eliminated.

The remote control of the digital processing stage-box by a remote control device does require transmitting control signals between the digital processing stage-box and the remote control device. However, transmission of control signals require much less bandwidth than audio input and output, is easier handle in a way that is reliable and relatively error free, and may even use higher latency forms of transmission. The signals may be transmitted wirelessly or through a cable that is not as expensive and unwieldy as the multi-core cable.

Illustrative Embodiment

Figure 1A:
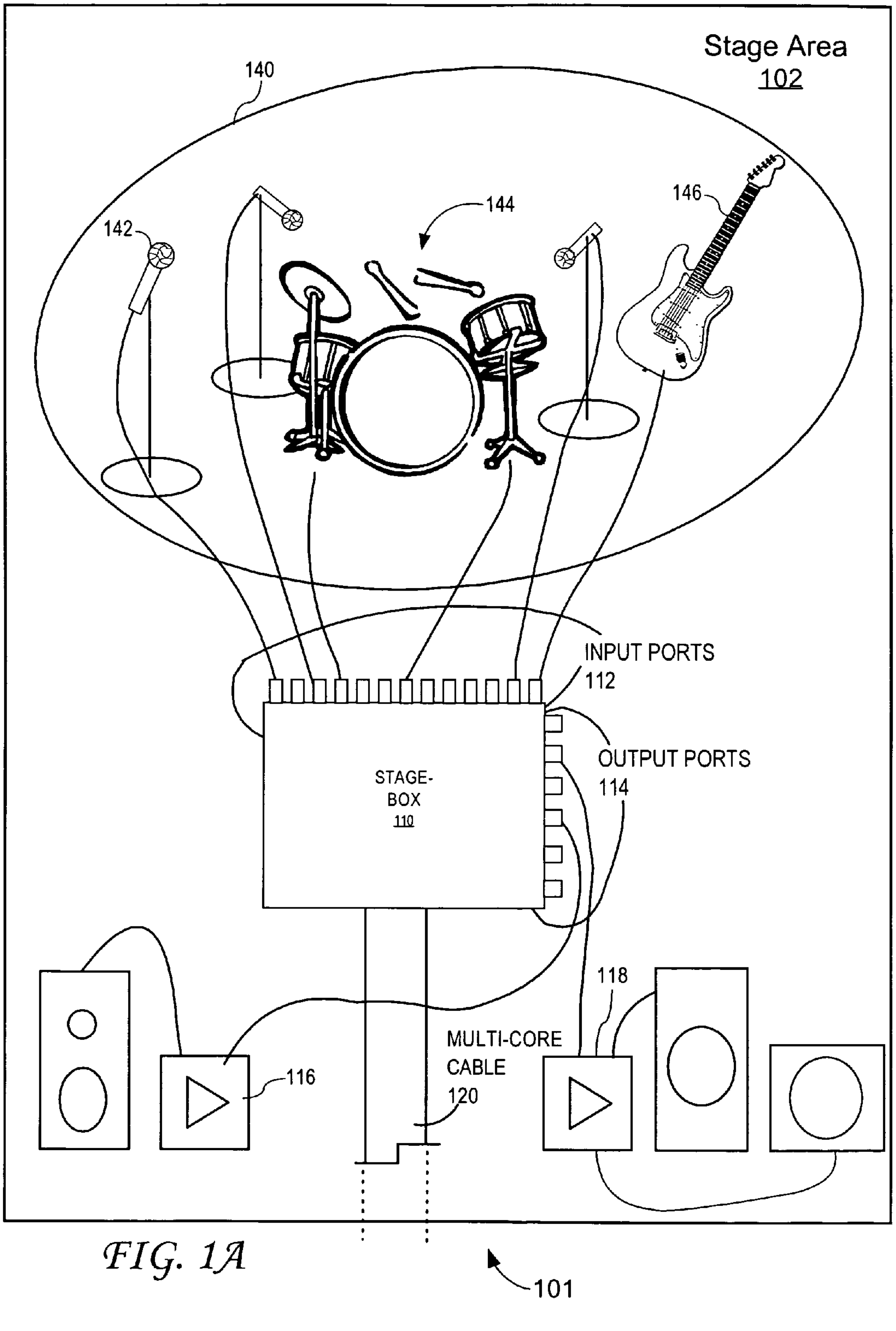
FIGS. 1A and 1B are diagrams of an audio system that connects microphones and instruments to a mixer via a stage-box and a composite cord running from the stage-box through an audience area to a mixer.
Figure 1B:
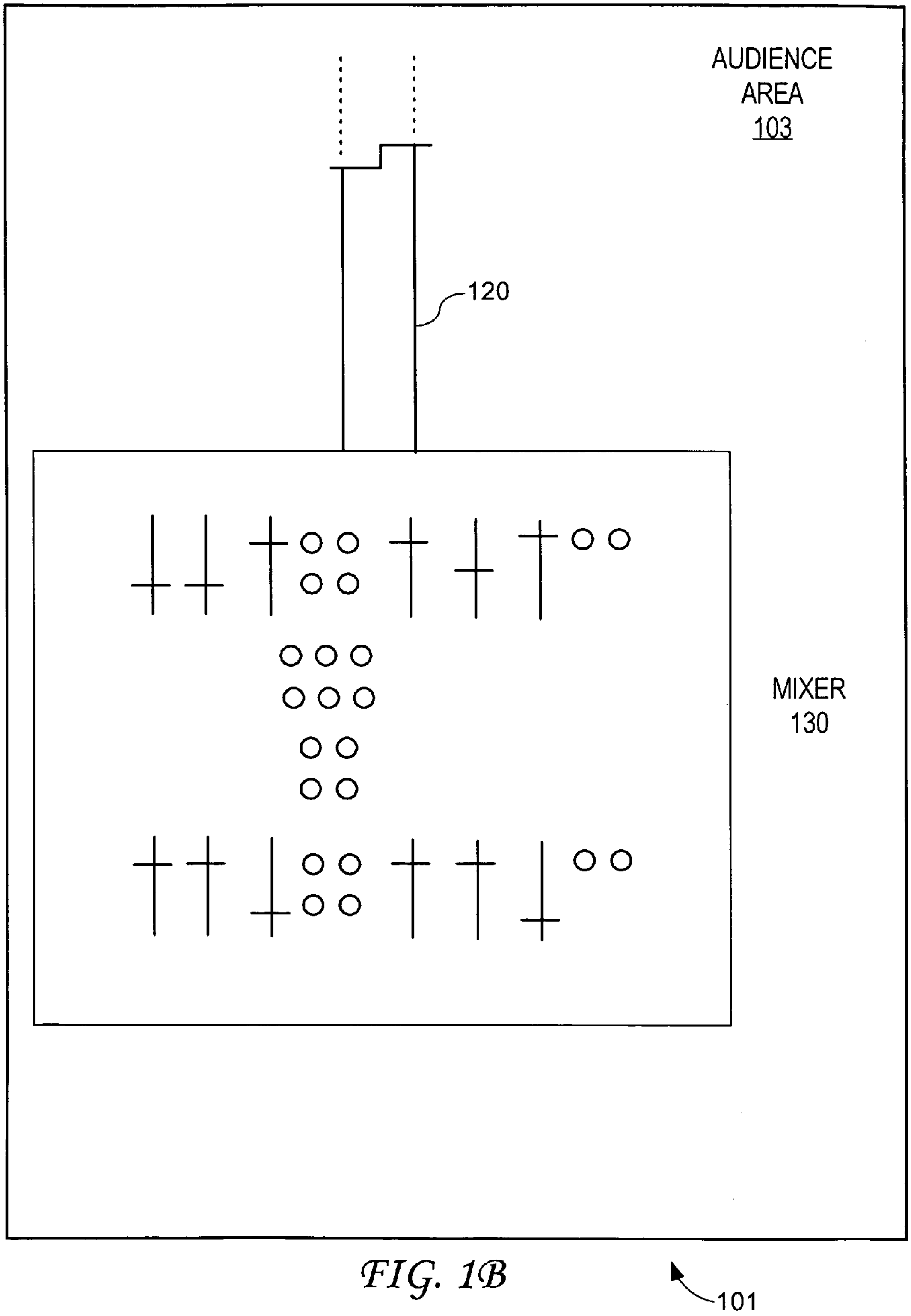
Figure 2A:
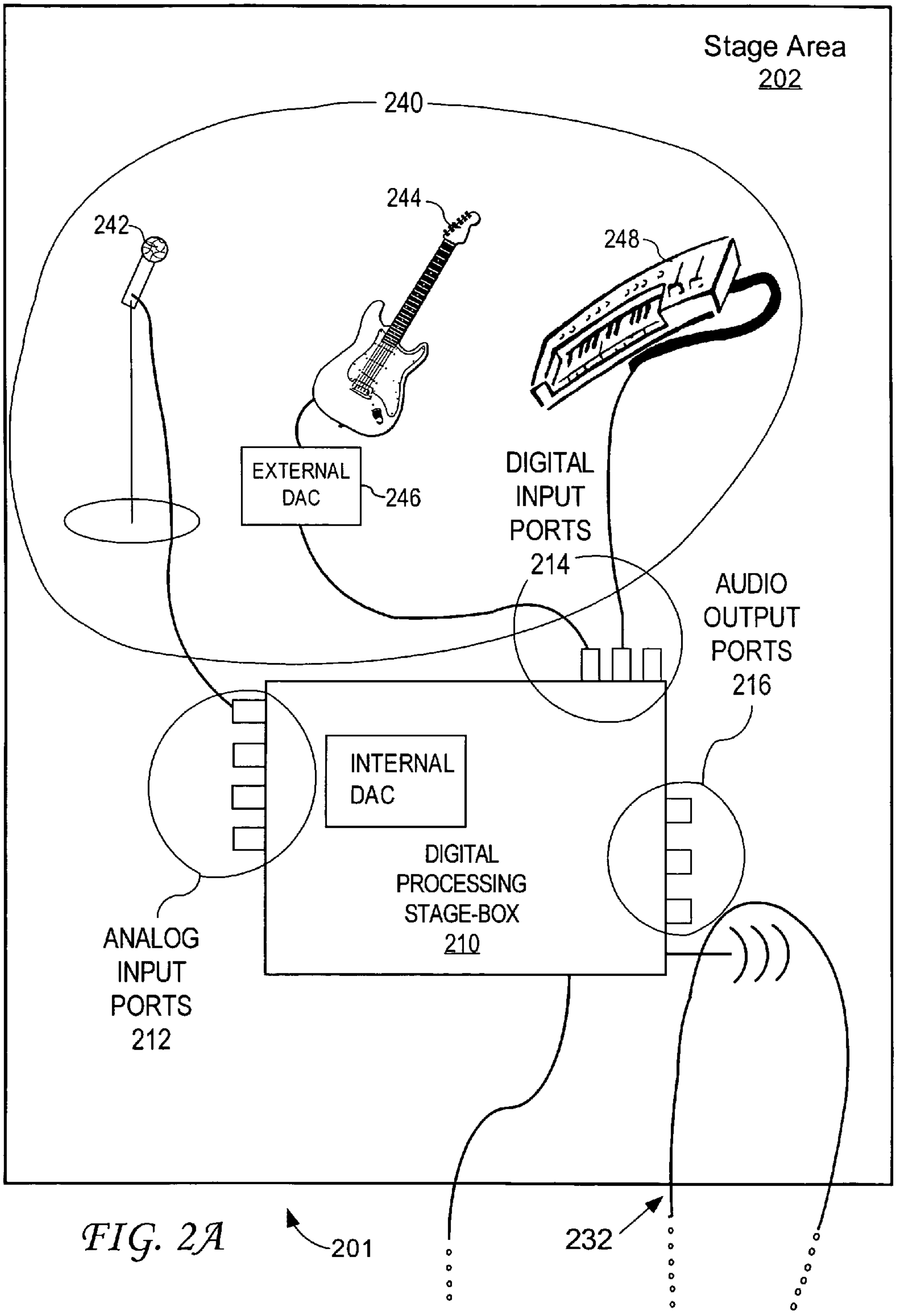
FIGS. 2A and 2B are diagrams of a digital processing stage-box that may be located on a stage and may be controlled remotely via a network, which may be wireless, according an embodiment of the present invention.
Figure 2B:
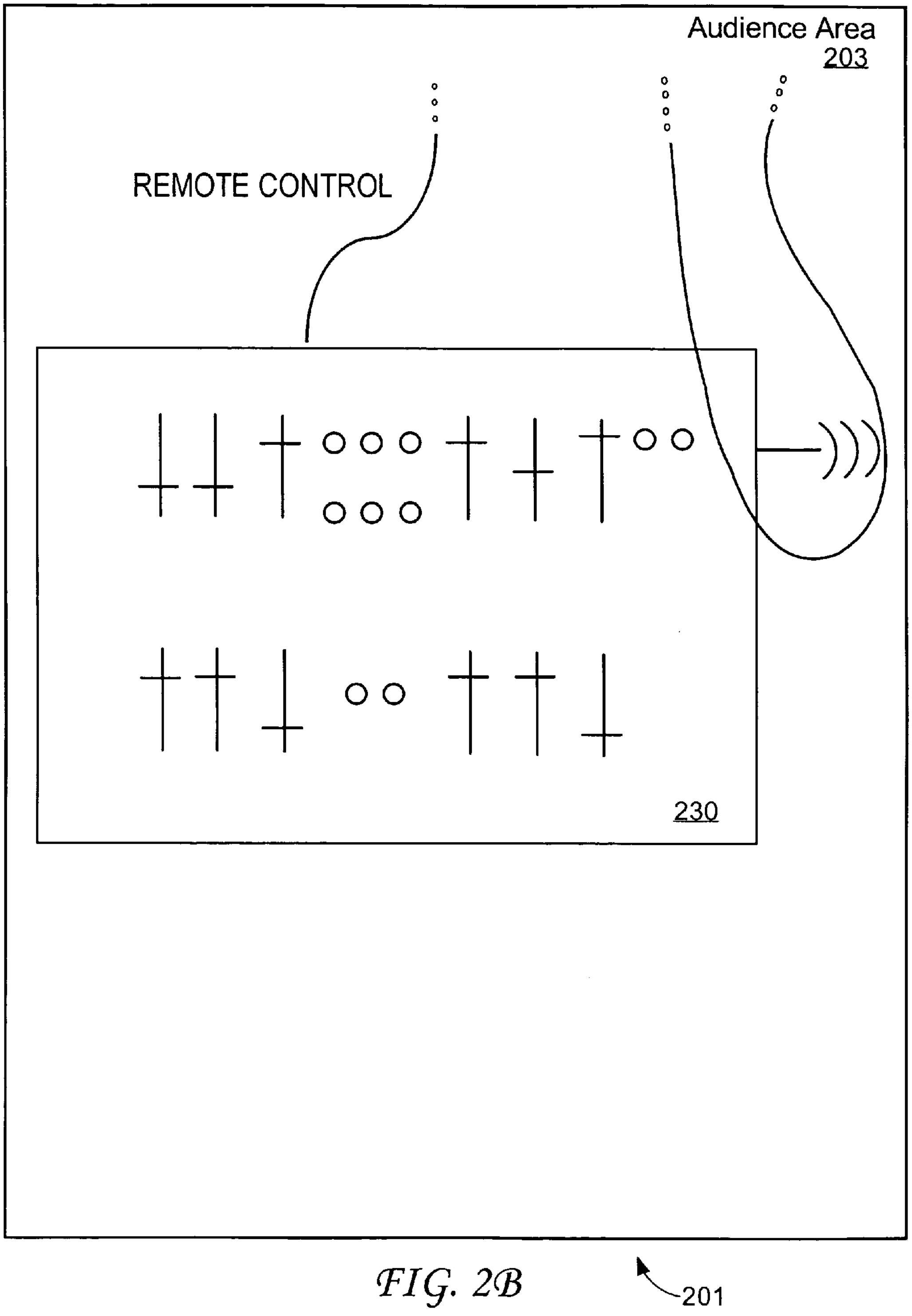

FIGS. 2A and 2B depict an audio system 201 that includes an on-stage digital processing stage-box according to an embodiment of the present invention. Referring to FIG. 2, audio system 201 includes digital processing stage-box 210, a device that contains the electronics required for digital audio processing of audio input from audio input devices. The audio input may be an analog audio signal and/or digital audio signal. The digital processing of the audio input generates audio output, which may also be in the form of an analog audio signal and/or digital audio signal. The term digital audio processing refers to manipulating digital information to alter audio properties of the audio source represented by the digital information, to, for example, adjust volume, bass, and treble, and to mix audio inputs from multiple audio input devices. Digital processing stage-box 210 generates audio output for real-time and simultaneous playback of audio input from audio input devices 240 to an audience.

Digital processing stage-box 210 receives audio input from audio input devices 240, which include microphone 242, guitar 244, external DAC (digital audio converter) 246, and key board 248. Audio input devices 240 and digital processing stage-box 210 are located on stage area 202, which is in front of audience area 203.

Microphone 242 generates analog input and is connected to one of analog input ports 212 of digital processing stage-box 210. An analog audio signal received through an analog input port 212 is processed by an internal DAC integrated within the electronic circuitry of digital processing stage-box 210. Once an analog audio signal is converted to digital audio data, it is digitally processed by digital processing stage-box 210.

Guitar 244 is connected to external DAC 246, a device that is not an integrated component of guitar 244. Guitar 244 provides audio input, in the form of an audio analog signal to external DAC 246, which converts the signal to a digital audio signal. The digital audio signal is transmitted through a connection to digital processing stage-box 210 via digital input ports 214.

Keyboard 248 is a digital keyboard. Keyboard 248 transmits a digital audio signal through a connection to digital processing stage-box 210 via a digital input port 214.

Preferably, the connection between an audio input device and digital processing stage-box 210 via digital input port 214 is made using a low latency network. When a musician sings or plays an instrument, it is desirable that the playback response time, between when a musician generates a sound and when the music is played back over audio system 201, that the playback appear immediate to the musician. A low latency network, as the term is used herein, transmits data fast enough to a digital processing stage-box to allow a playback on audio system 201 to seem immediate or acceptably immediate to a musician generating the sound being played back. A high latency network, as the term is used herein, does not transmit data fast enough to be a low latency network.

Cable based network connections (e.g. copper based cables, fiber optic based cables) typically provide low latency network connections while wireless network connections do not. Thus, the connection between an audio input device and digital processing stage-box 210 via a digital input port 214 is made using a cable based Local Area Network ("LAN") connection using LAN protocols, such as Ethernet. However, a wireless network connection may be used so long as it has low latency.

Digital processing stage-box 210 also includes audio output ports 216 through which digital processing stage-box 210 transmits audio output to audio output devices, such as an amplifier that drives speakers. Digital processing stage-box 210 may transmit as the audio output an audio analog signal or digital audio signal.

Remote Control Device

Remote control device 230 is a device for controlling the operation of digital processing stage-box 210. Remote control device 230 sends via its LAN connection to digital processing stage-box 210 control messages that specify how digital processing stage-box 210 should process audio input and generate audio output. A message may instruct digital processing stage-box 210 to alter the volume, bass, or treble of audio output generated for the audio input received via a particular analog input port 212 or digital input port 214.

Preferably, the LAN is a radio frequency wireless network connection, such as wireless network connection 232. The network wireless connection can use any radio frequency wireless protocol suitable for LAN, such as those that comply with IEEE standards 802.11b, 802.11a and 802.11g.

The use of a wireless connection eliminates the need to connect a remote control device 230 to digital processing stage-box 210 using a cable that must be run through the audience area 203. Further, the connection need not be a low latency network connection. The response time between when an operator provides input to remote control device 230 and when the digital processing stage-box 210 responds to the input may be greater than that required for a musician singing into microphone or playing an instrument.

Alternatively, control signals may be sent via a wire-based network connection. While a wire-based network connection may require a protected cord that runs through audience area 203, such a cord has far less wires and is far less unwieldy and expensive than a multi-core cable.

Remote control device 230 may take many forms. It may be a device with mechanically operated controls that are manipulated by a user to control the operation of digital processing stage-box 210. The slider bars and knobs on the device serve as an interface that may be mechanically manipulated by the human to control the input or output of digital processing stage-box 210. For example, a user may move a slider bar on remote control device 230 to cause remote control device 230 to transmit a message, sent via wireless network connection 232, that instructs digital processing stage-box 210 to alter the output volume generated for an audio input received via a particular analog input port 212 or digital input port 214. Remote control device 230 is placed within or behind the audience area 203 to allow an operator to monitor output of audio system 201 and make adjustments to the operation of digital processing stage-box 210 as needed to produce the desired playback properties.

Remote control device 230 may be a notebook or handheld computer running a graphical user interface used to control digital processing stage-box 210. With the portability offered by the particular combination of a wireless network and handheld computer, a user may monitor the sound generated by a particular configuration of digital processing stage-box 210 at various locations throughout audience area 203 and make on-the-spot adjustments to that configuration.

Individual Control by On-Stage Musicians

As shown above, there are various key features of an embodiment of a digital processing stage-box, which include that all digital audio processing may be performed on-stage in the digital processing stage-box, that the only information that needs to be transmitted from off-stage to this unit is control information (e.g. control signals), and that only a small number of audio streams need be sent from the digital processing stage-box as audio output. These key features enable very complex musician monitoring configurations on-stage.

For example, every musician on-stage may have access to a personal remote control device, preferably a device that is wireless, that controls the digital processing of the musician's monitoring mix by the digital stage-box. The digital processing stage-box can digitally process each musician's monitoring output separately, so each musician can adjust the audio the musician hears through monitoring boxes or headphones to the musicians personal needs. Only a single audio output per musician is needed to deliver the personal monitor mix. With traditional analog equipment, such a system requires a very large number of cables on stage, as every input audio signal has to be sent to every personal monitor mixer of every musician.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for generating audio output from a plurality of audio input devices, comprising:

a digital processing stage-box comprising a processor, said digital processing stage-box configured to:

receive audio input from a plurality audio input devices of said plurality of audio input devices, perform digital processing of said audio input, and generate audio output for simultaneous playback of said plurality of audio input devices based on said digital processing; and a plurality of electronic devices corresponding to said plurality of audio input devices and connected to said digital processing stage-box via a network, wherein each electronic device of said electronic devices is configured:

with a user interface that receives user input that indicates how to perform said digital processing for the audio input of said corresponding audio input device, and based on said user input, transmit via said network, control messages that indicate how to perform said digital processing for the audio input of said corresponding audio input device to said digital processing stage-box, wherein each of the plurality of electronic devices communicates directly with said digital processing stage-box.

2. The system of claim 1, wherein said network is a radio frequency wireless LAN.

3. The system of claim 1, wherein said network is a cable based network.

4. The system of claim 1, wherein said plurality of audio input devices include at least one audio input device that is a microphone or musical instrument playable by a human.

5. The system of claim 4, wherein said at least one audio input device is connected to said digital processing stage-box via a cable based LAN.

6. The system of claim 4, wherein said at least one audio input device provides analog audio input to said to a digital processing stage-box.

7. The system of claim 1, wherein said user interface of said electronic device includes manual controls manipulatable by a human to generate said user input that indicates how to perform said digital processing.

8. The system of claim 1, wherein said electronic device is a computer and said user interface is a graphical user interface running on said computer.

9. A digital processing stage-box for generating audio output from a plurality of audio input devices, wherein said digital processing stage-box is configured to:

receive audio input from a plurality audio input devices of said plurality of audio input devices;

receive via LAN control messages from a plurality of electronic devices corresponding to said plurality of audio input devices, wherein a LAN control message from an electronic device indicates how to perform said digital processing for audio input from said corresponding audio input device;

perform digital processing of said audio input;

generate audio output for simultaneous playback of said plurality of audio input devices based on said digital processing;

wherein the digital processing stage-box comprises a processor, and wherein each of the plurality of electronic devices communicates directly with said digital processing stage-box.

10. The digital processing stage-box of claim 9, wherein said LAN is a radio frequency wireless LAN.

11. The digital processing stage-box of claim 9, wherein said LAN is a cable based network.

12. The digital processing stage-box of claim 9, wherein said plurality of audio input devices include at least one audio input device that is a microphone or a musical instrument playable by a human.

13. The system of claim 12, wherein said at least one audio input device is connected to said digital processing stage-box via a cable based LAN.

14. The system of claim 12, wherein said at least one audio input device provides analog audio input to said digital processing stage-box.

15. A method of generating audio output at a live music event, the method comprising:

a digital processing stage-box, comprising a processor, receiving audio input from a plurality of audio input devices that are located on a stage to generate said live music, said plurality of audio input devices including at least one audio input device that is a microphone or a musical instrument that provides an audio input signal to said digital processing stage-box via a cord;

said digital processing stage-box performing digital processing of said audio input;

said digital processing stage-box generating audio output for simultaneous playback of said plurality of audio input devices based on said digital processing;

wherein a plurality of electronic devices corresponding to said plurality of audio input devices are connected to said digital processing stage-box via a network;

each electronic device of said plurality of electronic devices receiving user input that indicates how to perform said digital processing for audio input from said corresponding audio input device; and based on said user input, each electronic device of said plurality of electronic devices transmitting via said network to said digital processing stage-box control messages that indicate how to perform said digital processing for audio input from said corresponding audio input device, wherein each of the plurality of electronic devices communicates directly with said digital processing stage-box.

16. The method of claim 15, wherein said network is a radio frequency wireless LAN.

17. The method of claim 15, wherein said network is a cable based LAN.

18. The method of claim 17, wherein said at least one audio input device is connected to said digital processing stage-box via a cable based LAN.

19. The method of claim 17, wherein said at least one audio input device provides an analog audio input to said digital processing stage-box.

20. The system of claim 1, wherein each user input, that indicates how to perform said digital processing for the audio input of said corresponding audio input device, is received from a user operating that corresponding audio input device.

* * * * *